United States Patent
Kao

(10) Patent No.: US 10,243,721 B2
(45) Date of Patent: Mar. 26, 2019

(54) SYSTEM, APPARATUS AND METHOD FOR SEPARATELY TRANSMITTING HALF-DUPLEX SIGNALS IN RX AND TX DIRECTIONS

(71) Applicant: ATEN International Co., Ltd., New Taipei (TW)

(72) Inventor: Kuo-Feng Kao, New Taipei (TW)

(73) Assignee: ATEN INTERNATIONAL CO., LTD., New Taipei (TW)

( * ) Notice: Subject to any disclaimer, the term of this patent is extended or adjusted under 35 U.S.C. 154(b) by 146 days.

(21) Appl. No.: 15/295,501

(22) Filed: Oct. 17, 2016

(65) Prior Publication Data

US 2017/0118002 A1 Apr. 27, 2017

(30) Foreign Application Priority Data

Oct. 21, 2015 (TW) .............................. 104216871 U

(51) Int. Cl.
*H04L 5/14* (2006.01)
*H04L 5/16* (2006.01)

(52) U.S. Cl.
CPC .............. *H04L 5/1461* (2013.01); *H04L 5/16* (2013.01)

(58) Field of Classification Search
CPC ................................ H04L 5/1461; H04L 5/16
See application file for complete search history.

(56) References Cited

U.S. PATENT DOCUMENTS

| 8,462,759 B2 * | 6/2013 | Shakiba | H04L 25/0264 370/344 |
| 2009/0199154 A1 * | 8/2009 | Baratta | G06F 8/34 717/100 |
| 2011/0243568 A1 | 10/2011 | Lai | |
| 2011/0246681 A1 | 10/2011 | Lai | |
| 2014/0211095 A1 * | 7/2014 | Dickens | H04N 5/38 348/723 |

FOREIGN PATENT DOCUMENTS

| CN | 2585498 | 11/2003 |
| TW | 201135473 | 10/2011 |

* cited by examiner

*Primary Examiner* — Lan-Huong Truong
(74) *Attorney, Agent, or Firm* — Chen Yoshimura LLP

(57) ABSTRACT

A system, apparatus and method for communicating half-duplex signals and full-duplex signals. The system includes an input unit, a separation unit and an output unit. The input unit includes a D± data channel for communicating differential data signals D± in both directions in half-duplex mode. The output unit includes a receiving channel D±RX and a transmitting channel D±TX for respectively communicating receiving differential signals D±RX and transmitting differential signals D±TX in full-duplex mode. The separation unit, coupled to the input unit and output unit, separately transmits differential data signals D± from the D± channel of the input unit as transmitting differential signals D±TX to the D±TX channel of the output unit, and transmits receiving differential signals D±RX from the D±RX channel of the output unit as D± data to the D± data channel of the input unit.

34 Claims, 8 Drawing Sheets

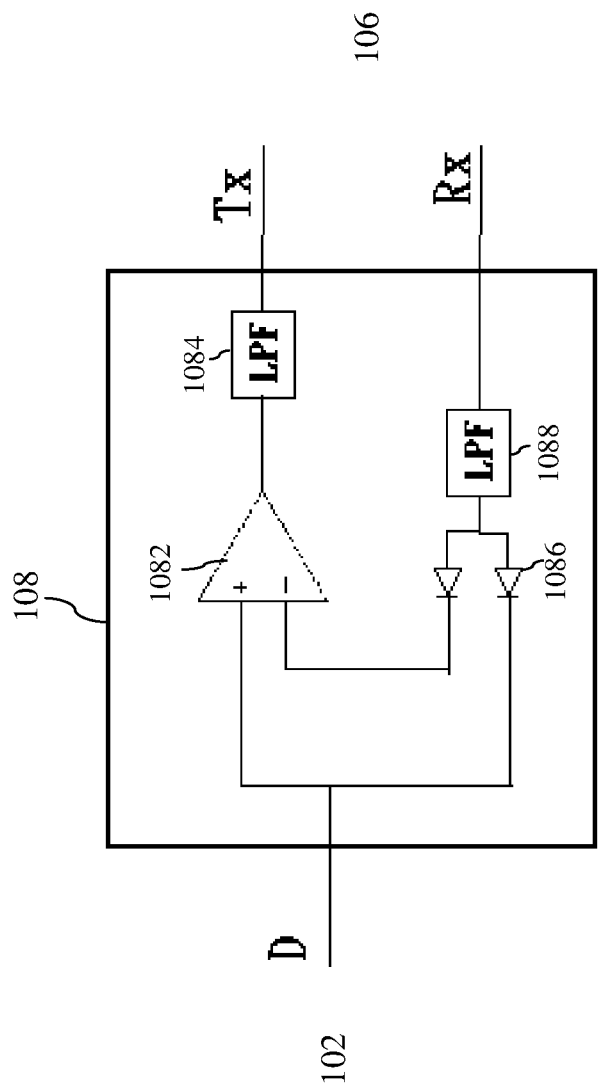

SYSTEM, APPARATUS AND METHOD FOR SEPARATELY TRANSMITTING HALF-DUPLEX SIGNALS IN RX AND TX DIRECTIONS

BACKGROUND OF THE INVENTION

Field of the Invention

This invention relates to system, apparatus and method for transmitting signals, and in particular, it relates to system, apparatus and method for transmitting half-duplex signals as two differential signals for two opposite directions.

Description of Related Art

Various electronic products have their specific communication ports for connecting with other electronic products. Most electronic products use bus transmission interfaces. In earlier days, mouse devices and keyboards were typically connected to computers using PS/2 interfaces, but PS/2 has gradually been replaced by bus transmission interfaces. In addition, smartphones also use bus transmission interfaces to transmit data and to supply power.

With improvements in technologies, the speed and capacity for data transmission continuously increase, and bus transmission technologies are improving correspondingly. The transmission speed of only 1.5 Mbit/s for earlier USB (Universal serial bus) 1.0 technologies had increased to 480 Mbit/s for USB 2.0 and 5 Gbps for USB 3.0, even up to 10 Gbps for USB 3.1. Common USB connectors are divided into A type and B type based on device requirements, and each type is further divided into micro and mini types. Based on USB 3.1 high speed transmission specification, the internal structure of Type C connectors can support high speed data transmission and power supply, as well as support Displayport. One feature of the exterior design of Type C connectors is that its upper and lower sides are identical, so the user does not need to distinguish between the "up" side and "down" side, and the connector can be plugged in with either side facing up. The multiple bus interfaces, however, create a compatibility problem; for example, because the USB 2.0 and USB 3.0 are physically incompatible, these two transmission interfaces cannot support each other. Currently, special purpose chips are typically used to solve the incompatibility of USB 2.0 and USB 3.0; however, such chips have complex circuitry and are costly, and are therefore not economical for practical use.

SUMMARY

Accordingly, the present invention is directed to a separation device and related method which substantially obviates one or more of the problems due to limitations and disadvantages of the related art. The separation devices have a relatively simple structure and low cost, and can support compatibility of different bus interfaces. The device can also be used in signal extenders.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a system for communicating half-duplex signals at one end and full-duplex signals at another end, which includes an input unit, an output unit, and a separation unit coupled between them. The input unit has a data signal channels for communicating differential data signals (D±). The output unit has a transmitting channel for communicating transmitting differential signals (D±TX) and a receiving channel for communicating receiving differential signals (D±RX). The separation unit has a first channel coupled to the data signal channels of the input unit, a second channel coupled to the transmitting channel of the output unit, and third channel coupled to the receiving channel of the output unit, the separation unit including a plurality of windings, the separation unit coupling the differential data signals (D±) from the first channel to the second channel as the transmitting differential signals (D±TX) without coupling the differential data signals (D±) to the third channel, and coupling the receiving differential signals (D±RX) from the third channel to the first channel as the differential data signals (D±) without coupling the receiving differential signals to the second channel.

In some embodiments, the separation unit includes a first winding coupled to the second channel, a second winding coupled to the third channel, a third and a fifth winding coupled to the first channel, and a fourth and sixth winding coupled to each other, wherein the first winding is inductively coupled to the third and forth windings and the second winding is inductively coupled to the fifth and sixth windings. In some embodiment, the system further includes a low-speed coupling circuit coupled between the input unit and the first channel of the separation unit. In some embodiment, the system further includes a switching unit coupled between the separation unit and the output unit. The switching circuit includes at least one high pass filter and at least one low pass filter.

In another aspect, the present invention provides a device for supporting different bus interfaces, which includes a bus connector port, a transceiver module, and a separation unit coupled between them. The bus connector port has a data signal channels for communicating differential data signals (D±). The transceiver module has a transmitting channel for communicating transmitting differential signals (D±TX) and a receiving channel for communicating receiving differential signals (D±RX) with a peripheral device. The separation unit has a first channel coupled to the data signal channels of the bus connector port, a second channel coupled to the transmitting channel of the transceiver module, and third channel coupled to the receiving channel of the transceiver module, the separation unit including a plurality of electromagnetic windings, the separation unit coupling the differential data signals (D±) from the first channel to the second channel as the transmitting differential signals (D±TX) without coupling the differential data signals (D±) to the third channel, and coupling the receiving differential signals (D±RX) from the third channel to the first channel as the differential data signals (D±) without coupling it to the second channel.

In some embodiments, the separation unit includes a first winding coupled to the second channel, a second winding coupled to the third channel, a third and a fifth winding coupled to the first channel, and a fourth and sixth winding coupled to each other, wherein the first winding is inductively coupled to the third and forth windings and the second winding is inductively coupled to the fifth and sixth windings. In some embodiments, the device further includes a low-speed coupling circuit coupled between the bus connector port and the first channel of the separation unit. In some embodiments, the device further includes a switching unit coupled between the separation unit and the transceiver module. The switching circuit includes at least one high pass filter and at least one low pass filter.

In another aspect, the present invention provides a method for communicating half-duplex signals and full-duplex signals, which includes: receiving differential data signals (D±) via an input unit; transmitting the differential data signals (D±) from the input unit to a first channel of a separation unit; the separation unit, via a plurality of windings, coupling the differential data signals (D±) from the first channel to a second channel of the separation unit as the transmitting differential signals (D±TX) without coupling the differential data signals (D±) to third channel of the separation unit; receiving receiving differential signals (D±RX) at the third channel of the separation unit; and the separation unit, via the plurality of windings, coupling the receiving differential signals (D±RX) from the third channel to the first channel as the differential data signals (D±) without coupling the receiving differential signals (D±RX) to the second channel.

In some embodiments, the separation unit includes a first winding coupled to the second channel, a second winding coupled to the third channel, a third and a fifth winding coupled to the first channel, and a fourth and sixth winding coupled to each other, wherein the first winding is inductively coupled to the third and forth windings and the second winding is inductively coupled to the fifth and sixth windings.

In some embodiments, the step of transmitting the differential data signals (D±) from the input unit to the first channel of the separation unit includes: transmitting the differential data signals (D±) from input unit to a low-speed coupling circuit and then to the first channel of the separation unit.

In some embodiments, the step of transmitting the transmitting differential signals (D±TX) from the third channel of the separation unit to the transmitting channel of the output unit includes: transmitting the transmitting differential signals (D±TX) from the third channel of the separation unit to a switching unit and then to the transmitting channel of the output unit.

It is to be understood that both the foregoing general description and the following detailed description are exemplary and explanatory and are intended to provide further explanation of the invention as claimed.

BRIEF DESCRIPTION OF THE DRAWINGS

FIG. 3 schematically illustrates an example of the low-speed signal coupling circuit of the first embodiment.

DETAILED DESCRIPTION OF PREFERRED EMBODIMENTS

Embodiments of the present invention are described below with reference to the drawings.

The invention is described using preferred embodiments and different aspects. Detailed descriptions of the embodiments are provided below; however, those skilled in the relevant art will appreciate that some details may not be required to implement the invention. Further, some structures and their functions well known to those skilled in the art are not described in detail to simplify the description. The terms used in this disclosure should be given broadest reasonable interpretations, and understood in accordance with the descriptions below.

First Embodiment

Figure 1:
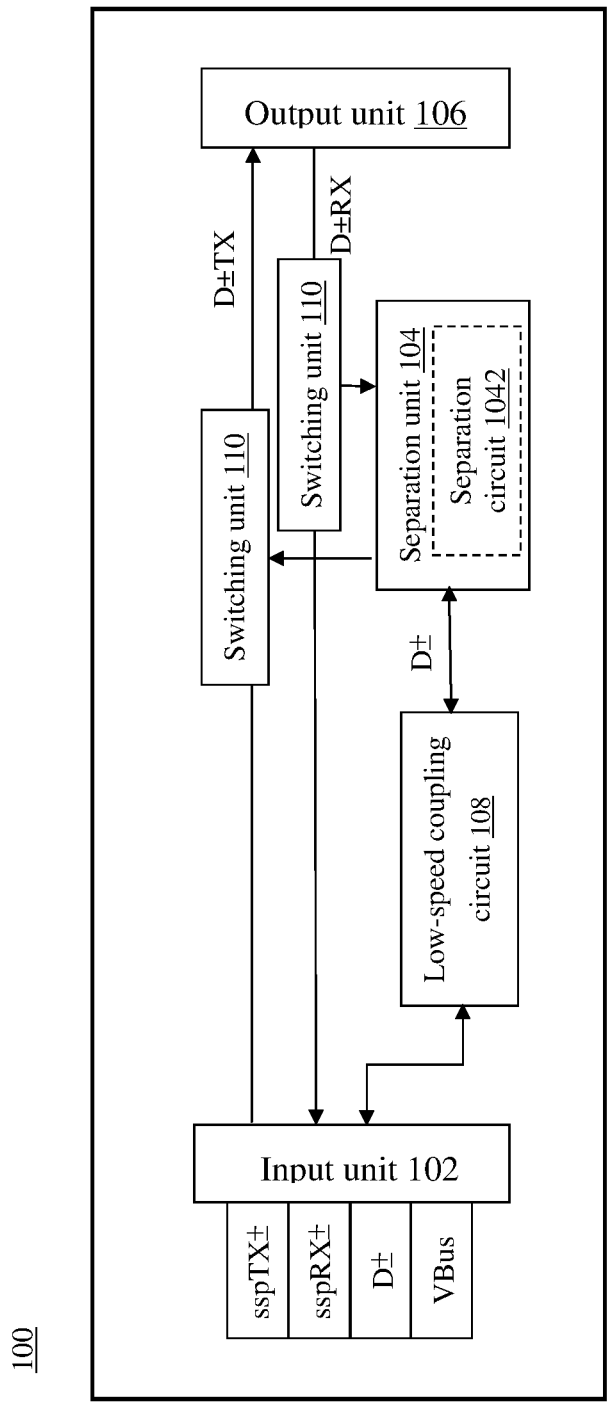
FIG. 1 is a block diagram of a system according to a first embodiment of the present invention.

Refer to FIG. 1, which is a block diagram showing a system 100 for separately transmitting half-duplex signals in opposite directions according to a first embodiment of the present invention. The system 100 includes an input unit 102, a separation unit 104, and an output unit 106. The separation unit 104 is coupled between the input unit 102 and the output unit 106. The input unit 102 has data signal channels (D±) for transmitting or receiving differential data signals. In one embodiment, the input unit 102 includes an electronic device or a peripheral device (not shown in the drawings). Those or ordinary skill in the art should appreciate that the input unit 102 may include other transmitting channels; in the example of USB 2.0 interface, they include VBus channels, etc., but are not limited to such.

Figure 2A:
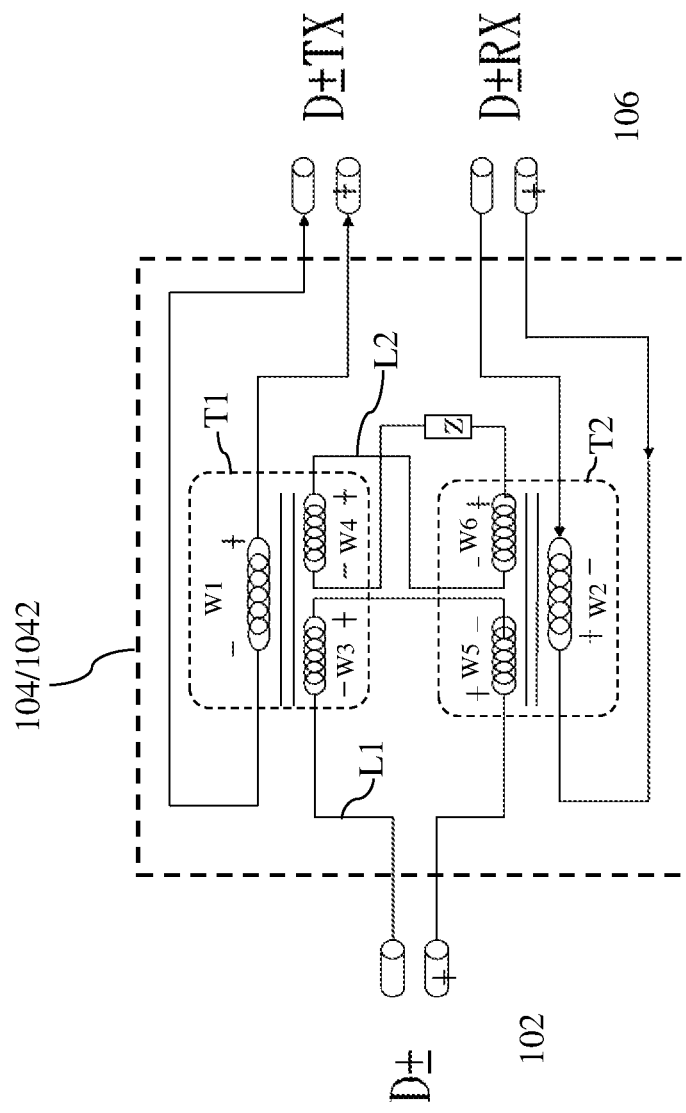
FIG. 2A schematically illustrates an example of the separation unit of the first embodiment.
Figure 2B:
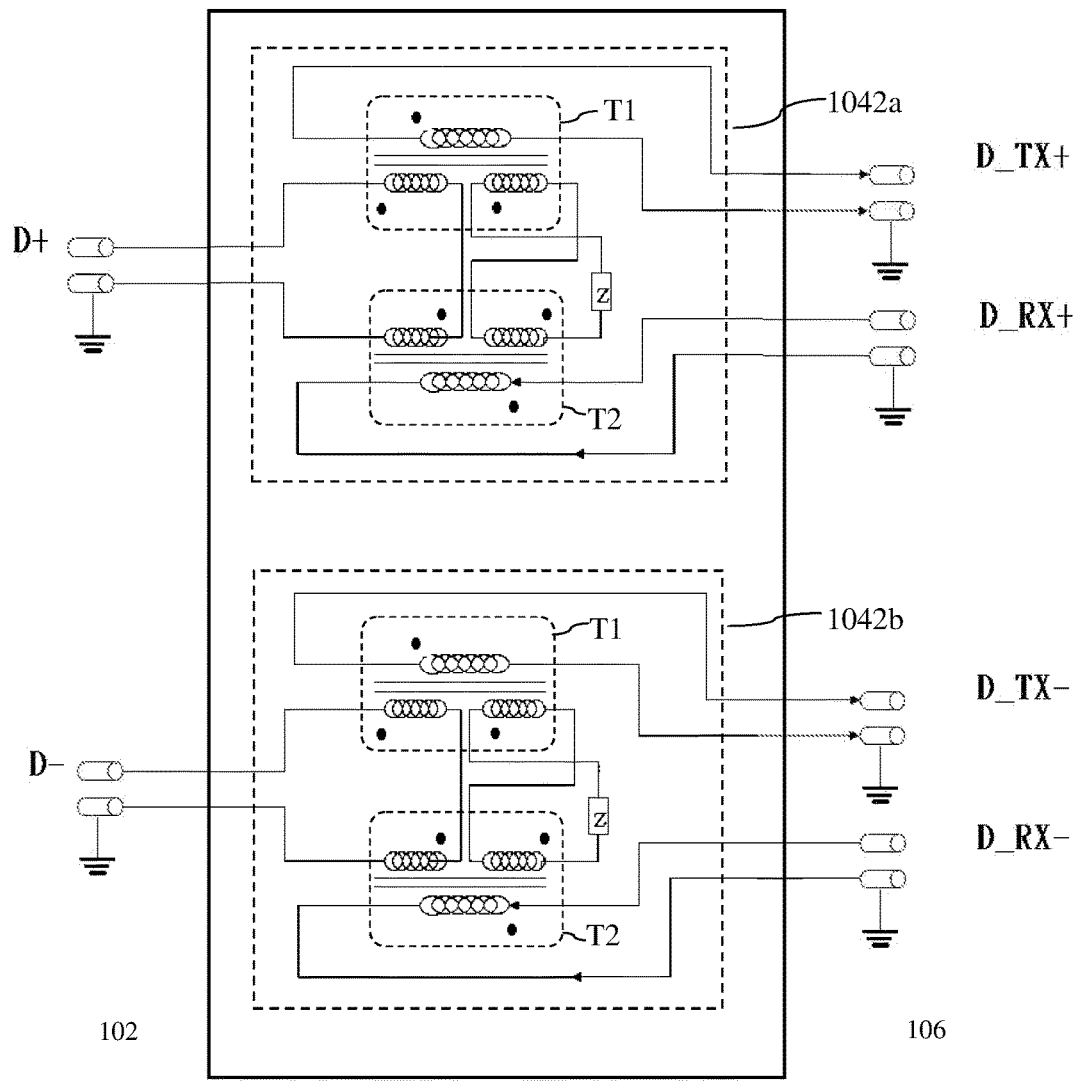
FIG. 2B schematically illustrates another example of the separation unit of the first embodiment.
Figure 2C:
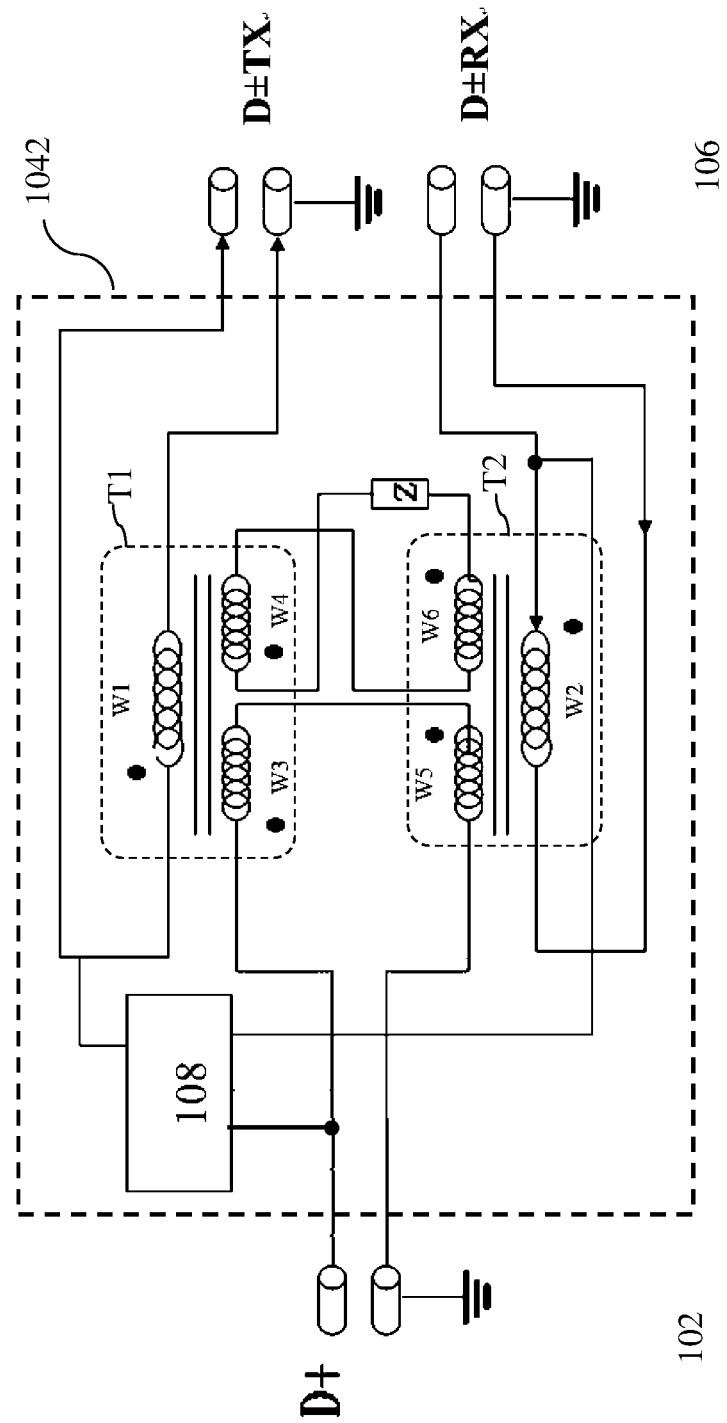
FIG. 2C schematically illustrates a variation of the separation unit shown in FIG. 2A.

In one embodiment, the separation unit 104 includes a separation circuit 1042, examples of which are shown in FIGS. 2A and 2B. The separation circuit 1042 includes multiple windings, and uses inductive coupling of the windings to transmit data signals including transmitting differential signals (D±TX) and receiving differential signals (D±RX), described in more detail below. The output unit 106 has a receiving channel and a transmitting channel, respectively transmitting the receiving differential signals (D±RX) and the transmitting differential signals (D±TX) between the separation unit 104 and external electronic devices. Each signal line of the input unit 102 has two respective connector ports, and each signal line of the receiving channel and the transmitting channel of the output unit 106 respectively has two connector ports, the two connector ports for each signal line being the high voltage level (+) port and a low voltage level (−) port, where the low voltage level (−) port is coupled to ground, as shown in FIGS. 2B and 2C. The system 100 according to this embodiment can be used for different communication interfaces, to facilitate compatibility of the data transmission. In one preferred embodiment, the input unit 102 is configured to be coupled to a USB 2.0 transmission interface and the output unit 106 is configured to be coupled to a USB 3.0 transmission interface. The separation unit 104 bridges the different transmission interfaces, to achieve compatibility of the data transmission. This example is used in the descriptions below.

Refer to FIG. 1 and FIG. 2A, the separation unit 104 includes a separation circuit 1042. In one preferred embodiment, the separation circuit 1042 uses an inductive coupling circuit, which includes multiple electromagnetic elements.

In this embodiment, the electromagnetic elements include, without limitation, electromagnetic windings. Refer to FIG. 2B, the separation unit 104 includes a positive separation circuit 1042a and a negative separation circuit 1042b. The positive separation circuit 1042a is used to transmit the positive one of the differential signal (D+), and the negative separation circuit 1042b is used to transmit the negative one of the differential signal (D−). The positive separation circuit 1042a and negative separation circuit 1042b have similar structures, the difference being their drive patterns. In a preferred embodiment, the positive separation circuit 1042a and negative separation circuit 1042b each uses an inductive coupling circuit, which includes multiple electromagnetic elements. In this embodiment, the electromagnetic elements include, without limitation, electromagnetic windings. The descriptions below use the separation circuit 1042 shown in FIG. 2A as an example, but they apply to the positive separation circuit 1042a and negative separation circuit 1042b of FIG. 2B.

Refer to FIG. 2A, the separation circuit 1042 includes first to sixth windings (W1 to W6). The third winding W3 and the fifth winding W5 are coupled to the input unit 102; the third winding W3 and the fifth winding W5 are coupled in series with each other, and respectively coupled to the two connector ports of the input unit 102. Thus, the input unit 102, the third winding W3 and the fifth winding W5 form the first loop L1. The fourth winding W4 and the sixth winding W6 are coupled in series to form a second loop L2. The first winding W1 is coupled to the transmitting channel of the output unit 106, and the second winding W2 is coupled to the receiving channel of the output unit 106. More specifically, the first winding W1 is coupled between the two (+ and −) connector ports of the transmitting channel, and the second winding W2 is coupled between the two (+ and −) connector ports of the receiving channel.

In a preferred embodiment, the first winding W1 is inductively coupled to the third winding W3 and the fourth winding W4, i.e., the first winding W1, the third winding W3 and the fourth winding W4 form a first inductive transformer circuit T1. The second winding W2 is inductively coupled to the fifth winding W5 and the sixth winding W6, i.e., the second winding W2, the fifth winding W5 and the sixth winding W6 form a second inductive transformer circuit T2. The loop L1 (W3 and W5) and the loop L2 (W4 and W6) are formed in a way that, when two currents respectively flow in loop L1 and loop L2 such that the current through the third winding W3 and the current through the fourth winding W4 are in the same direction for the first inductive transformer circuit T1, then the current through the fifth winding W5 and the current through the sixth winding W6 are opposite in directions for the second inductive transformer circuit T2; and conversely, when two currents respectively flow in loop L1 and loop L2 such that the current through the fifth winding W5 and the current through the sixth winding W6 are in the same direction for the second inductive transformer circuit T2, then the current through the third winding W3 and the current through the fourth winding W4 are in the opposite directions for the first inductive transformer circuit T1.

When a signal D±TX is to be transmitted from the data signal channel D± of the input unit 102, which is a first communication interface (e.g. USB 2.0), to the transmitting (TX) channel of the output unit 106, which is a second communication interface (e.g. USB 3.0), the third winding W3 will induce a signal in the first winding W1, thereby generating the signal D±TX at the transmitting channel of the output unit 106. At the same time, the first winding W1 induces a signal in the fourth winding W4, which is of the same direction as the signal in the third winding W3 for the first inductive transformer circuit T1. Thus, the current through the fifth winding W5 and the current through the sixth winding W6 are in opposite directions for the second inductive transformer circuit T2. As a result, their effects cancel each other, so the signal induced in the second winding W2 is zero. The result is that the signal from the data channel D± of the input unit 102 is coupled to only the transmitting (TX) channel of the output unit 106 and not coupled to the receiving (RX) channel of the output unit 106.

On the other hand, when a signal D±RX is to be transmitted from the receiving channel of the output unit 106 to the data signal channel D± of the input unit 102, the current in the second winding W2 will induce a signal in the fifth winding W5, which generates a signal D±RX for the data transmission channel of the input unit 102. The current in the second winding W2 will also induce a current in the sixth winding W6, which will be in the same direction for the second inductive transformer circuit T2 as the current in the fifth winding W5. Thus, due to the connection of the first loop L1 and the second look L2, the current through the third winding W3 and the current through the fourth winding W4 are in opposite directions for the first inductive transformer circuit T1. As a result, their effects cancel each other, so the signal induced in the first winding W1 is zero. The result is that the signal from the receiving channel of the output unit 106 is coupled to only the data channel of the input unit 102 and not coupled to the transmitting channel of the output unit 106.

In summary, by using the two inductive transformer circuits T1 and T2 and due to the design of the loops L1 and L2, an interface (input unit 102) that uses half-duplex transmission (using one data channel D±, for providing communication in both directions but only one direction at a time) and an interface (output unit 106) that uses full-duplex transmission (using a transmitting channel D±TX and a separate receiving channel D±RX, for providing simultaneous communication in both directions) can be coupled to each other to accomplish data transmission between them. In other words, signals can be transmitted from the data channel D± of the input unit 102 to the transmitting channel D±TX of the output unit 106, and transmitted from the receiving channel D±RX of the output unit 106 to the data channel D± of the input unit 102. This can be used to support data transmission between USB 2.0 (half-duplex) and USB 3.0 (full-duplex).

In this embodiment, the windings W1, W3 and W4 in the first inductive transformer circuit T1 may have winding ratio of 1:1:1, or preferably 2:1:1; similarly, the windings W2, W5 and W6 in the second inductive transformer circuit T2 may have winding ratio of 1:1:1, or preferably 2:1:1.

In another embodiment, as shown in FIG. 1, the system 100 further includes a low-speed coupling circuit 108. Because the D± signal of USB 2.0 may includes low-frequency signal, such as signal of a frequency lower than 200 KHz, such signal cannot be separately transmitted as the transmitting differential signals D±TX and the receiving differential signals D±RX. Thus, the low-speed coupling circuit 108 is used to process the signal first. The low-speed coupling circuit 108 may be incorporated into the separation unit 104 (as shown in FIG. 2C), or may be a separate unit coupled between the separation unit 104 and the input unit 102 (as shown in FIG. 1).

As shown in FIG. 3, the low-speed coupling circuit 108 includes a first amplifier (comparator) 1082, first LPF (low pass filter) 1084, two second amplifiers 1086 and second LPF 1088. The first amplifier 1082 and the first LPF 1084 are connected in series between the first communication interface and the transmitting channel of the second communication interface, and the two amplifiers 1086 and the second LPF 1088 are connected in series between the first communication interface and the receiving channel of the second communication interface. The two second amplifiers 1086 are respectively coupled to the positive and negative inputs of the first amplifier (comparator) 1082. The amplifiers may be implemented using transistors and diodes or other devices.

Figure 4:
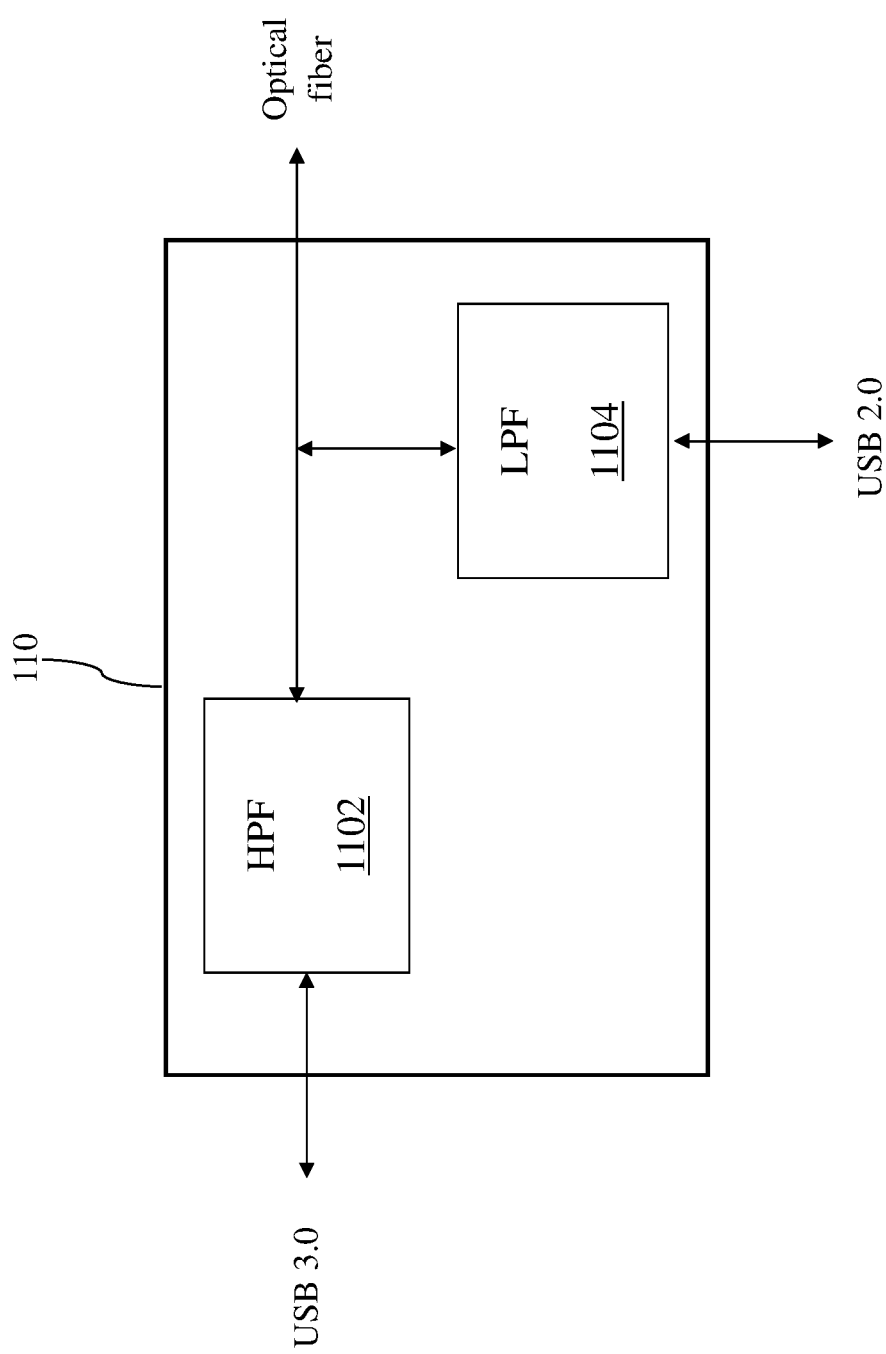
FIG. 4 schematically illustrates an example of the switching unit of the first embodiment.

In another embodiment, as shown in FIG. 1, the system 100 further includes a switching unit 110, coupled between the separation unit 104 and the output unit 106, and/or between the input unit 102 and the output unit 106. The switching unit 110 includes an HPF (high pass filter) and a LPF (low pass filter), for filtering signals based on their frequency. For example, the HPF may permit only signals higher than 1 GHz to pass, and the LPF may permit only signals lower than 500 MHz to pass. The purpose of the switching unit 110 is that the HPF passes relatively high frequency signals to the USB 3.0 communication interface and the LPF passes relatively low frequency signals to the USB 2.0 communication interface, as shown in FIG. 4.

Second Embodiment

Figure 5:
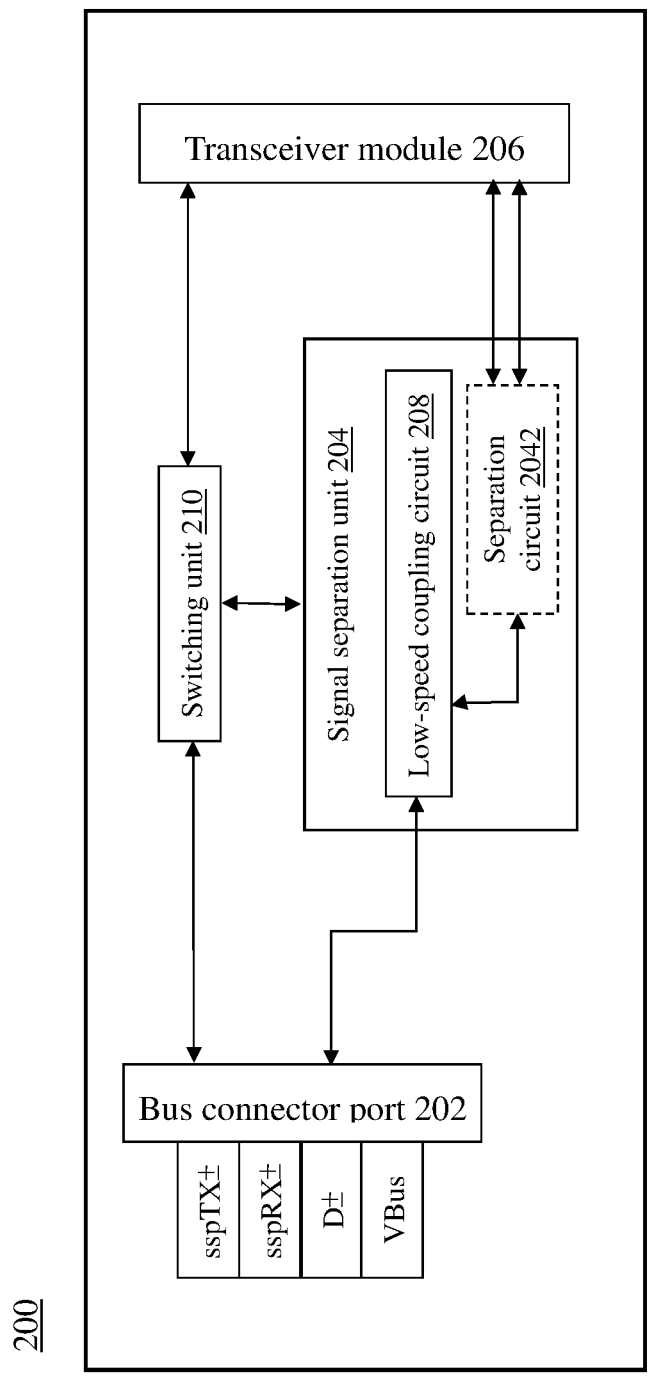
FIG. 5 is a block diagram of a device according to a second embodiment of the present invention.

Refer to FIG. 5, which illustrates a device 200 that can simultaneously support different bus interfaces according to another embodiment of the present invention. The device 200 is coupled between a first communication interface and a second communication interface. The device 200 includes a bus connector port 202, a signal separation unit 204 and a transceiver module 206. The bus connector port 202 is coupled to the data signal channel (D±) of the first communication interface. The transceiver module 206 is coupled via connection cables (e.g. fiber optic cables or CAT twisted pair cables) to the second communication interface of a peripheral device. In a preferred embodiment, the first communication interface is USB 3.0 and the second communication interface is USB 2.0, but they are not limited to such. In another embodiment, the first communication interface is USB 2.0 and the second communication interface is USB 3.0. Such a swap has the same effect.

The signal separation unit 204 is coupled to the bus connector port 202, and includes a separation circuit 2042, for separately transmitting the data signal (D±) as receiving signals (D±RX) and transmitting signals (D±TX). The transceiver module 206 is coupled to the separation unit 204, and includes a receiving channel and a transmitting channel (not shown in the drawings), for transmitting signals to or receiving signals from a peripheral device. For example, the device 200 may be coupled at one end to a USB 3.0 port of a computer, and coupled at the other end to a USB 2.0 peripheral device, so that the device 200 can support compatibility of USB 3.0 and USB 2.0 devices. Further, the device 200 may be integrated in a remote module (coupled to peripheral devices) and a local module (coupled to electronic devices) of an extender system. When the remote module and the local module are connected to each other by optical fibers, the transceiver module 206 may be an optical transceiver module, for example and without limitation, QSFP or SFP module.

The signal separation unit 204 includes the above-described circuit 100, and the separation circuit 2042 of the separation unit 204 may be similar to the separation circuit 1042 of the separation unit 104 of FIG. 1. In one embodiment, the separation circuit 2042 is an inductive coupling circuit, including multiple electromagnetic elements, and its circuit structure, working principle and function are similar to those of the separation circuit 1042 described above.

In one embodiment, the device 200 also includes a low-speed coupling circuit 208, coupled between the bus connector port 202 and the signal separation unit 204, or incorporated into the signal separation unit 204. The circuit structure and working principle of the low-speed coupling circuit 208 are similar to those of the low-speed coupling circuit 108 of the circuit 100 described above. Likewise, in another embodiment, the device 200 further includes a switching unit 210, coupled between the signal separation unit 204 and the transceiver module 206, and its circuit structure and working principle are similar to those of the switching element 110 of the circuit 100.

Third Embodiment

Figure 6:
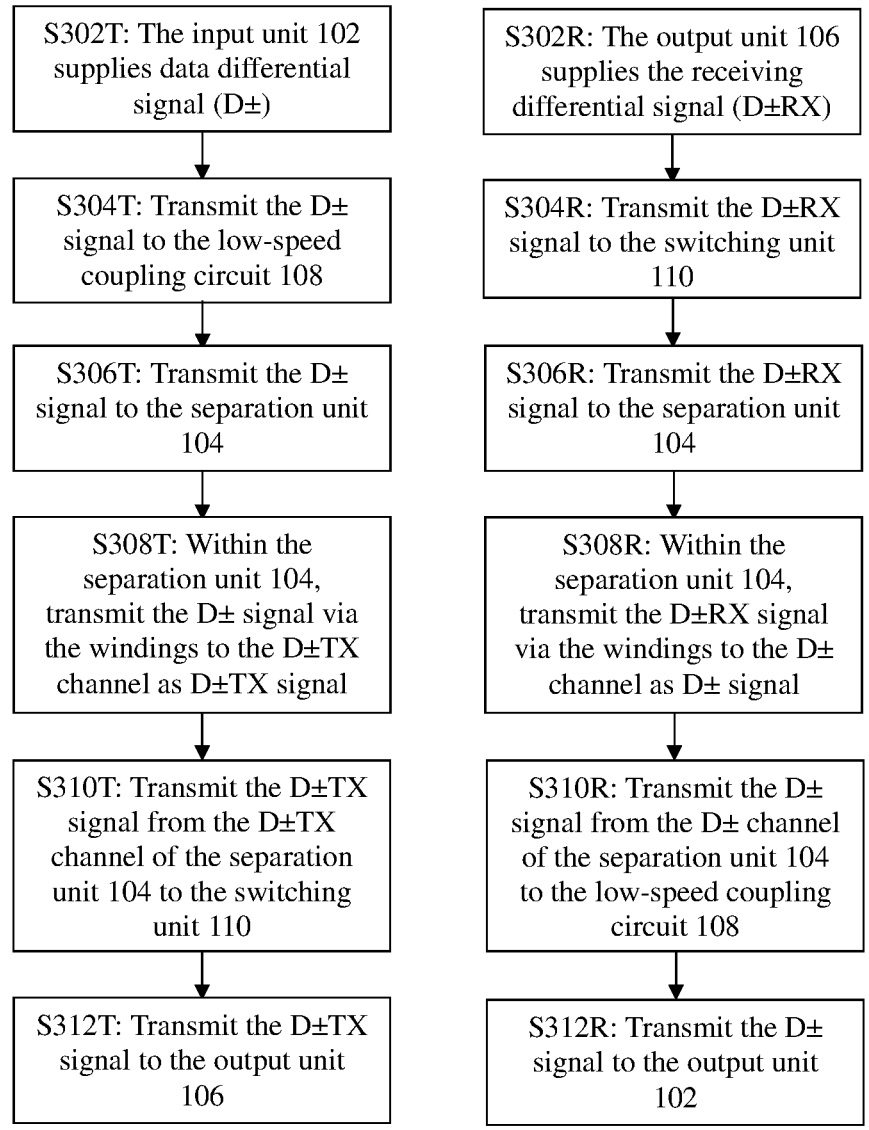
FIG. 6 is a flowchart showing a method according to a third embodiment of the present invention.

Refer to FIG. 6, which is a flowchart showing a method of transmitting half-duplex signals according to an embodiment of the present invention. Unless otherwise specified, the various steps of the flowchart do not have to be performed in the illustrated order, i.e. the order of the steps can be changed and some steps can be performed simultaneously. Further, not all steps are required each time the method is performed, so some steps may be omitted in some embodiments. Other method flows may be used to implement the invention as well. The method may be performed by the system 100 or the device 200. The description below uses the system 100 as an example, and components of device 200 may be used to perform the method when appropriate.

In step S302T, the data signal channel of the input unit 102 supplies a data differential signal (D±). In one embodiment, the input unit 102 includes a bus connector port for an electronic device. In a preferred embodiment, the input unit 102 includes but is not limited to a USB 2.0 communication interface. The data differential signal (D±) is inputted from the electronic device via the bus connector port.

In step S304T, the data differential signal (D±) is transmitted to the low-speed coupling circuit 108. In the preferred embodiment, the data differential signal (D±) received from the USB 2.0 communication interface may contain low frequency signals lower than 200 KHz, which is undesirable for downstream signal separation. Therefore, the low-speed coupling circuit 108 is used first to increase the frequency of the signal to achieve a certain limit, so that it can be separated later. Step S304T is optional, and can be adjusted depending on the communication interface involved.

In step S306T, the data differential signal (D±) is transmitted to the separation unit 104. In step S308T, within the separation unit 104, the data differential signal (D±) is transmitted via the windings to the D±TX channel of the separation unit 104 as the transmitting differential signals (D±TX). The separation unit 104 is coupled to the input unit 102, or coupled to the low-speed coupling circuit 108. The separation unit 104 is as described in the first embodiment, or may be replaced by the signal separation unit 204 of the second embodiment. The working principle and function of the separation unit 104 and signal separation unit 204 are as described earlier, which uses two inductive transformer circuits to separately transmit the data differential signal (D±) as the transmitting differential signal (D±TX) and the receiving differential signal (D±RX).

In step S310T, the D±TX signal is transmitted from the D±TX channel of the separation unit 104 to the switching unit 110. The switching unit 110 includes an HPF and a LPF, the two filters filter the signals based on frequency to pass desired frequency signals. For example, the HPF may pass signals higher than 1 GHz in frequency, and the LPF may pass signals lower than 500 MHz in frequency. The purpose of the switching unit 110 is that: the HPF sends higher frequency signals to the USB 3.0 communication interface, while the LPF sends lower frequency signals to the USB 2.0 communication interface. Step S310T and the switching unit 110 used in this step may be selected appropriately based on need.

In step S312T, the D±TX signal is transmitted from the switching unit 110 to the output unit 106. In one embodiment, the output unit 106 includes a bus interfaces for electronic devices. In a preferred embodiment, the output unit 106 includes but is not limited to a USB 3.0 communication interface.

Steps S302T to S312T occur when the signal is transmitted from the input unit 102 to the output unit 106 (i.e. in the TX direction). When the signal is transmitted from the output unit 106 to the input unit 102 (i.e. in the RX direction), the reverse steps S302R to S312R occur. In step S302R, the receiving channel D±RX of the output unit 106 supplies the receiving differential signals (D±RX). In step S304R, the D±RX signal is transmitted from the output unit 106 to the switching unit 110. In step S306R, the D±RX signal is transmitted from the switching unit 110 to the separation unit 104. In step S308R, within the separation unit 104, the receiving differential signal D±RX is transmitted via the windings to the D± channel of the separation unit 104 as the data differential signals (D±). In step S310R, the D± signal is transmitted from the D± channel of the separation unit 104 to the low-speed coupling circuit 108. In step S312R, the D± signal is transmitted from the low-speed coupling circuit 108 to the input unit 102.

Using the above steps, the method 300 communicates half-duplex signal (D±) at one end and full-duplex signals D±TX and D±RX at the other end, which helps support the compatibility between different communication interfaces, in particular, the compatibility between half-duplex communication and full-duplex communication.

In summary, embodiments of the present invention use induction method to separately transmit half-duplex signals in opposite directions as two differential signals. Such devices can reduce manufacturing cost. Further, embodiments of the present invention may be used in signal extenders, in particular, signal extenders that support USB 2.0 and USB 3.0.

Embodiments of the present invention are described in detail above. Those skilled in the art will be able to practice the invention without undue experimentation. In some embodiments, some well known structures and devices may not be included in the block diagrams. Other structures in addition to those shown in the drawings may be present as well and may be disposed between the components shown in the drawings. Further, additional input and output may be included as well although not shown in the drawings.

Some components that are shown as standalone circuits may also be partly or completely incorporated in other circuits, so each element recited in the claims may correspond to one or more of the illustrated circuits or parts thereof.

Various components in the embodiments may be implemented by general or special purpose processors and computer programs which are stored in computer-readable memories and executed by processors. Various components may also be implemented in logic circuits.

In this disclosure, when a component A is said to be coupled to or connected to a component B, it should be understood that component A may be directly coupled or connected to component B, or be coupled or connected to component B indirectly via a component C. When it is described that a component, characteristic, structure, program or property A causes a component, characteristic, structure, program or property B, it should be understood that A at least partly causes B, and it is possible that other component, characteristic, structure, program or property may also contribute to cause B. When the disclosure uses the word "may", the component, characteristic, structure, program or property is not limited to what is described in the disclosure. When the disclosure uses "a" or "one", the number is not limited to one.

It will be apparent to those skilled in the art that various modification and variations can be made in the devices and methods of the present invention without departing from the spirit or scope of the invention. Thus, it is intended that the present invention cover modifications and variations that come within the scope of the appended claims and their equivalents.

What is claimed is:

1. A system for communicating half-duplex signals at one end and full-duplex signals at another end, comprising:
an input circuit, having a plurality of signal lines forming a data signal channel for communicating differential data signals (D±) which are the half-duplex signals;
an output circuit, having a plurality of signal lines forming a transmitting channel for communicating transmitting differential signals (D±TX) which are a transmitting part of the full-duplex signals, and a plurality of signal lines forming a receiving channel for communicating receiving differential signals (D±RX) which are a receiving part of the full-duplex signals; and
a separation circuit, having a first plurality of signal lines forming a first channel coupled to the data signal channel of the input circuit, a second plurality of signal lines forming a second channel coupled to the transmitting channel of the output circuit, and a third plurality of signal lines forming a third channel coupled to the receiving channel of the output circuit, the separation circuit including a plurality of electromagnetic windings which couple the differential data signals (D±) from the first channel to the second channel as the transmitting differential signals (D±TX) without coupling the differential data signals (D±) to the third channel, and couple the receiving differential signals (D±RX) from the third channel to the first channel as the differential data signals (D±) without coupling the receiving differential signals to the second channel, wherein the half-duplex signals (D±) between the input circuit and the first channel are separated into the transmitting part of the full-duplex signals (D±TX) between the output circuit and the second channel and the receiving part of the full-duplex signals (D±RX) between the output circuit and the third channel, wherein the separation circuit includes a first winding coupled to the second channel, a second winding coupled to the third channel, a third and a fifth winding coupled to the first channel, and a fourth and sixth winding coupled to each other, wherein the first winding is inductively coupled to the third and fourth windings and the second winding is inductively coupled to the fifth and sixth windings.

2. The system of claim 1, further comprising a low-speed coupling circuit coupled between the input circuit and the first channel of the separation circuit.

3. The system of claim 2, wherein the low-speed coupling circuit includes at least one amplifier and at least one low pass filter.

4. The system of claim 1, further comprising a switching circuit coupled between the separation circuit and the output circuit.

5. The system of claim 4, wherein the switching circuit includes at least one high pass filter and at least one low pass filter.

6. A device for supporting different bus interfaces, comprising:
a bus connector port, having a plurality of signal lines forming a data signal channel for communicating differential data signals (D±) that comply with specifications of a first bus interface;
a transceiver circuit, having a plurality of signal lines forming a transmitting channel for communicating transmitting differential signals (D±TX) which are a transmitting part of signals complying with specifications of a second bus interface different from the first bus interface, and a plurality of signal lines forming a receiving channel for communicating receiving differential signals (D±RX) which are a receiving part of the signals complying with specifications of the second bus interface, with a peripheral device; and
a separation circuit, having a first plurality of signal lines forming a first channel coupled to the data signal channel of the bus connector port, a second plurality of signal lines forming a second channel coupled to the transmitting channel of the transceiver circuit, and a third plurality of signal lines forming a third channel coupled to the receiving channel of the transceiver circuit, the separation circuit including a plurality of electromagnetic windings, the separation circuit coupling the differential data signals (D±) from the first channel to the second channel as the transmitting differential signals (D±TX) without coupling the differential data signals (D±) to the third channel, and coupling the receiving differential signals (D±RX) from the third channel to the first channel as the differential data signals (D±) without coupling it to the second channel, wherein the differential data signals (D±) complying with the specifications of the first bus interface are separated into the transmitting part (D±TX) and the receiving part (D±RX) of the signals complying with the specifications of the first bus interface, wherein the separation circuit includes a first winding coupled to the second channel, a second winding coupled to the third channel, a third and a fifth winding coupled to the first channel, and a fourth and sixth winding coupled to each other, wherein the first winding is inductively coupled to the third and fourth windings and the second winding is inductively coupled to the fifth and sixth windings.

7. The device of claim 6, further comprising a switching circuit coupled between the separation circuit and the transceiver circuit.

8. The device of claim 7, wherein the switching circuit includes at least one high pass filter and at least one low pass filter.

9. The device of claim 6, further comprising a low-speed coupling circuit coupled between the bus connector port and the first channel of the separation circuit.

10. The device of claim 9, wherein the low-speed coupling circuit includes at least one amplifier and at least one low pass filter.

11. The device of claim 6, further comprising a cable coupled between the transceiver circuit and the peripheral device.

12. The device of claim 11, wherein the cable includes optical fibers, and wherein the transceiver circuit includes an optical transceiver.

13. A method for communicating half-duplex signals and full-duplex signals, comprising:
receiving differential data signals (D±) which are the half-duplex signals via a plurality of signal lines of an input circuit;
transmitting the differential data signals (D±) from the input circuit to a plurality of signal lines that form a first channel of a separation circuit;
the separation circuit, via a plurality of electromagnetic windings, coupling the differential data signals (D±) from the first channel to a plurality of signal lines that form a second channel of the separation circuit as the transmitting differential signals (D±TX) which are a transmitting part of the full-duplex signals, without coupling the differential data signals (D±) to a plurality of signal lines that form a third channel of the separation circuit;
receiving receiving differential signals (D±RX) which are a receiving part of the full-duplex signals, at the third channel of the separation circuit; and
the separation circuit, via the plurality of windings, coupling the receiving differential signals (D±RX) from the third channel to the first channel as the differential data signals (D±) without coupling the receiving differential signals (D±RX) to the second channel, wherein the half-duplex signals (D±) between the input circuit and the first channel are separated into the transmitting part of the full-duplex signals (D±TX) between the output circuit and the second channel and the receiving part of the full-duplex signals (D±RX) between the output circuit and the third channel, wherein the separation circuit includes a first winding coupled to the second channel, a second winding coupled to the third channel, a third and a fifth winding coupled to the first channel, and a fourth and sixth winding coupled to each other, wherein the first winding is inductively coupled to the third and fourth windings and the second winding is inductively coupled to the fifth and sixth windings.

14. The method of claim 13, wherein the separation circuit couples the differential data signals (D±) from the first channel to the second channel by inductive coupling of the third and fourth windings with the first winding.

15. The method of claim 13, wherein the separation circuit couples the receiving differential signals (D±RX) from the third channel to the second channel by inductive coupling of the second winding with the fifth and sixth windings.

16. The method of claim 13, wherein the step of transmitting the differential data signals (D±) from the input circuit to the first channel of the separation circuit includes:
transmitting the differential data signals (D±) from input circuit to a low-speed coupling circuit and then to the first channel of the separation circuit.

17. The method of claim 13, further comprising: transmitting the transmitting differential signals (D±TX) from the second channel of the separation circuit to a switching circuit.

18. The method of claim 13, further comprising: transmitting the transmitting differential signals (D±TX) from the switching circuit to a peripheral device.

19. A system for communicating half-duplex signals at one end and full-duplex signals at another end, comprising:
an input circuit, having a plurality of signal lines forming a data signal channel for communicating differential data signals (D±) which are the half-duplex signals;
an output circuit, having a plurality of signal lines forming a transmitting channel for communicating transmitting differential signals (D±TX) which are a transmitting part of the full-duplex signals, and a plurality of signal lines forming a receiving channel for communicating receiving differential signals (D±RX) which are a receiving part of the full-duplex signals;
a separation circuit, having a first plurality of signal lines forming a first channel coupled to the data signal channel of the input circuit, a second plurality of signal lines forming a second channel coupled to the transmitting channel of the output circuit, and a third plurality of signal lines forming a third channel coupled to the receiving channel of the output circuit, the separation circuit including a plurality of electromagnetic windings which couple the differential data signals (D±) from the first channel to the second channel as the transmitting differential signals (D±TX) without coupling the differential data signals (D±) to the third channel, and couple the receiving differential signals (D±RX) from the third channel to the first channel as the differential data signals (D±) without coupling the receiving differential signals to the second channel, wherein the half-duplex signals (D±) between the input circuit and the first channel are separated into the transmitting part of the full-duplex signals (D±TX) between the output circuit and the second channel and the receiving part of the full-duplex signals (D±RX) between the output circuit and the third channel; and
a low-speed coupling circuit coupled between the input circuit and the first channel of the separation circuit, the low-speed coupling circuit including at least one amplifier and at least one low pass filter.

20. The system of claim 19, wherein the separation circuit includes a first winding coupled to the second channel, a second winding coupled to the third channel, a third and a fifth winding coupled to the first channel, and a fourth and sixth winding coupled to each other, wherein the first winding is inductively coupled to the third and fourth windings and the second winding is inductively coupled to the fifth and sixth windings.

21. The system of claim 19, further comprising a switching circuit coupled between the separation circuit and the output circuit.

22. The system of claim 21, wherein the switching circuit includes at least one high pass filter and at least one low pass filter.

23. A device for supporting different bus interfaces, comprising:
a bus connector port, having a plurality of signal lines forming a data signal channel for communicating differential data signals (D±) that comply with specifications of a first bus interface;
a transceiver circuit, having a plurality of signal lines forming a transmitting channel for communicating transmitting differential signals (D±TX) which are a transmitting part of signals complying with specifications of a second bus interface different from the first bus interface, and a plurality of signal lines forming a receiving channel for communicating receiving differential signals (D±RX) which are a receiving part of the signals complying with specifications of the second bus interface, with a peripheral device;
a separation circuit, having a first plurality of signal lines forming a first channel coupled to the data signal channel of the bus connector port, a second plurality of signal lines forming a second channel coupled to the transmitting channel of the transceiver circuit, and a third plurality of signal lines forming a third channel coupled to the receiving channel of the transceiver circuit, the separation circuit including a plurality of electromagnetic windings, the separation circuit coupling the differential data signals (D±) from the first channel to the second channel as the transmitting differential signals (D±TX) without coupling the differential data signals (D±) to the third channel, and coupling the receiving differential signals (D±RX) from the third channel to the first channel as the differential data signals (D±) without coupling it to the second channel, wherein the differential data signals (D±) complying with the specifications of the first bus interface are separated into the transmitting part (D±TX) and the receiving part (D±RX) of the signals complying with the specifications of the first bus interface; and
a low-speed coupling circuit coupled between the bus connector port and the first channel of the separation circuit, the low-speed coupling circuit including at least one amplifier and at least one low pass filter.

24. The device of claim 23, further comprising a switching circuit coupled between the separation circuit and the transceiver circuit.

25. The device of claim 24, wherein the switching circuit includes at least one high pass filter and at least one low pass filter.

26. The device of claim 23, wherein the separation circuit includes a first winding coupled to the second channel, a second winding coupled to the third channel, a third and a fifth winding coupled to the first channel, and a fourth and sixth winding coupled to each other, wherein the first winding is inductively coupled to the third and fourth windings and the second winding is inductively coupled to the fifth and sixth windings.

27. The device of claim 23, further comprising a cable coupled between the transceiver circuit and the peripheral device.

28. The device of claim 27, wherein the cable includes optical fibers, and wherein the transceiver circuit includes an optical transceiver.

29. A method for communicating half-duplex signals and full-duplex signals, comprising:
receiving differential data signals (D±) which are the half-duplex signals via a plurality of signal lines of an input circuit;
transmitting the differential data signals (D±) from the input circuit to a plurality of signal lines that form a first channel of a separation circuit, including transmitting the differential data signals (D±) from input circuit to a low-speed coupling circuit which includes at least one amplifier and at least one low pass filter, and then to the first channel of the separation circuit;
the separation circuit, via a plurality of electromagnetic windings, coupling the differential data signals (D±) from the first channel to a plurality of signal lines that form a second channel of the separation circuit as the transmitting differential signals (D±TX) which are a transmitting part of the full-duplex signals, without coupling the differential data signals (D±) to a plurality of signal lines that form a third channel of the separation circuit;

receiving receiving differential signals (D±RX) which are a receiving part of the full-duplex signals, at the third channel of the separation circuit;

the separation circuit, via the plurality of windings, coupling the receiving differential signals (D±RX) from the third channel to the first channel as the differential data signals (D±) without coupling the receiving differential signals (D±RX) to the second channel, wherein the half-duplex signals (D±) between the input circuit and the first channel are separated into the transmitting part of the full-duplex signals (D±TX) between the output circuit and the second channel and the receiving part of the full-duplex signals (D±RX) between the output circuit and the third channel.

30. The method of claim 29, wherein the separation circuit includes a first winding coupled to the second channel, a second winding coupled to the third channel, a third and a fifth winding coupled to the first channel, and a fourth and sixth winding coupled to each other, wherein the first winding is inductively coupled to the third and fourth windings and the second winding is inductively coupled to the fifth and sixth windings.

31. The method of claim 30, wherein the separation circuit couples the differential data signals (D±) from the first channel to the second channel by inductive coupling of the third and fourth windings with the first winding.

32. The method of claim 30, wherein the separation circuit couples the receiving differential signals (D±RX) from the third channel to the second channel by inductive coupling of the second winding with the fifth and sixth windings.

33. The method of claim 29, further comprising: transmitting the transmitting differential signals (D±TX) from the second channel of the separation circuit to a switching circuit.

34. The method of claim 29, further comprising: transmitting the transmitting differential signals (D±TX) from the switching circuit to a peripheral device.

* * * * *